US011691189B2

(12) United States Patent
Zou et al.

(10) Patent No.: US 11,691,189 B2
(45) Date of Patent: Jul. 4, 2023

(54) ROBOT FOR OIL TANK CLEANING

(71) Applicant: Taiyuan University of Science and Technology, Taiyuan (CN)

(72) Inventors: Jingfeng Zou, Taiyuan (CN); Lifeng Ma, Taiyuan (CN); Jinli Meng, Taiyuan (CN); Lidong Ma, Taiyuan (CN); Lianyun Jiang, Taiyuan (CN); Yafeng Ji, Taiyuan (CN)

(73) Assignee: TAIYUAN UNIVERSITY OF SCIENCE AND TECHNOLOGY, Taiyuan (CN)

( * ) Notice: Subject to any disclaimer, the term of this patent is extended or adjusted under 35 U.S.C. 154(b) by 220 days.

(21) Appl. No.: 17/322,943

(22) Filed: May 18, 2021

(65) Prior Publication Data

US 2022/0111426 A1  Apr. 14, 2022

(30) Foreign Application Priority Data

Oct. 10, 2020 (CN) .......................... 202011075295.0

(51) Int. Cl.
*B08B 9/08* (2006.01)
(52) U.S. Cl.
CPC .............. *B08B 9/0808* (2013.01); *B08B 9/08* (2013.01); *B08B 9/0804* (2013.01); *B08B 2209/08* (2013.01)

(58) Field of Classification Search
CPC ....... B08B 9/08; B08B 9/0804; B08B 9/0808; B08B 9/087; B08B 9/20; B08B 9/36; B08B 9/38; B08B 2209/08
See application file for complete search history.

(56) References Cited

U.S. PATENT DOCUMENTS

2019/0374984 A1* 12/2019 Innes ...................... B05B 3/028

FOREIGN PATENT DOCUMENTS

CH          669 747 A5 *  4/1989
WO    WO 03/047780 A1 *  6/2003

\* cited by examiner

*Primary Examiner* — Randall E Chin
(74) *Attorney, Agent, or Firm* — Matthias Scholl P.C.; Matthias Scholl

(57) ABSTRACT

A robot includes a truss assembly, a walking assembly, a power unit, and a rack including a guide pillar, a second link. The truss assembly is disposed on the top of the rack. The walking assembly is disposed in the rack and fixedly connected to the rack through a bearing. The power unit is disposed on the rear end of the rack. An oil tank is provided with a hole. The truss assembly is configured to place the robot into the oil tank through the hole. The walking assembly is configured to drive the robot to move along the axis of the oil tank and to prevent the robot from toppling in the oil tank. The power unit is configured to clean the inside of the oil tank. The walking assembly includes two active walking assemblies, a drive assembly, and a folding assembly.

6 Claims, 6 Drawing Sheets

ROBOT FOR OIL TANK CLEANING

CROSS-REFERENCE TO RELATED APPLICATIONS

Pursuant to 35 U.S.C. § 119 and the Paris Convention Treaty, this application claims foreign priority to Chinese Patent Application No. 202011075295.0 filed Oct. 10, 2020, the contents of which, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, Mass. 02142.

BACKGROUND

The disclosure relates to the field of tank cleaning, and more particularly, to a robot for oil tank cleaning.

Oil tank is a cylinder container that functions as an important means of railway and road transport, occupying a significant market share in the transportation. Different/same media being transported have different requirements for the cleanliness of the oil tank, so that the oil tank should be cleaned regularly after being used. The oil tank can be cleaned manually or chemically. Manual cleaning is by far the most common method used for oil tank cleaning, including: draining as much oil residue from the oil tank as possible; opening an air vent; collecting a gas sample to determine its explosion characteristics to make sure that an explosion cannot occur and therefore allow staff to enter the oil tank for cleaning. Chemical cleaning is the use of chemicals to remove residual materials from walls of the oil tank. The stains react with the chemicals to form new substances that can be dissolved in the aqueous solution of the chemicals. The resulting mixture flows out of the tank. The stains are loosened by bubbles generated by the chemical reaction, improving the descaling effect.

The disadvantages are associated with the cleaning means:

1. With manual cleaning, staff works in a semi-closed space and high-risk space for a long period of time, in which the working environment is harsh and the labor intensity is high;

2. The waste residue produced by chemical treatment needs to be recycled, so the cost is high; the chemical waste liquid is not easy to treat, which is harmful to the environment;

3. The reaction conditions of the chemical cleaning method are severe. When the reaction conditions are not met, it may lead to low chemical treatment efficiency and poor cleaning result.

SUMMARY

Accordingly, the disclosure provides a robot for oil tank cleaning.

The robot comprises a truss assembly, a walking assembly, a power unit, and a rack comprising a guide pillar, a second link. The truss assembly is disposed on the top of the rack. The walking assembly is disposed in the rack and fixedly connected to the rack through a bearing. The power unit is disposed on the rear end of the rack. An oil tank is provided with a hole. The truss assembly is configured to place the robot into the oil tank through the hole. The walking assembly is configured to drive the robot to move along the axis of the oil tank and to prevent the robot from toppling in the oil tank. The power unit is configured to clean the inside of the oil tank.

The walking assembly comprises two active walking assemblies, a drive assembly, and a folding assembly. The rack is configured to provide structural supports for the walking assembly. The two active walking assemblies are respectively disposed on a hinge point below the rack. The drive assembly is disposed directly below the rack and configured to unfold or fold the two active walking assemblies. The folding assembly comprises a first link and is disposed on the guide pillar of the rack. One end of the first link is connected to the rack. The folding assembly is configured to assist the movement of the robot and is foldable and unfoldable by gravity.

Each of the two active walking assemblies comprises two spiral rubber wheels, a servo motor, a first drive chain, a gear transmission mechanism, and a first leg. The servo motor is fixedly disposed on the first leg. One end of the first leg is connected to the rack and another end of the first leg is connected to the gear transmission mechanism. The spiral rubber wheel is disposed on the gear transmission mechanism. The servo motor is configured to transmit the driving torque to one of the two spiral rubber wheels through the first drive chain, and the gear transmission mechanism transmits the driving torque to another spiral rubber wheel. The spiral rubber wheel comprises a first shaft inserted through a hole disposed in the first leg. Two adjacent spiral rubber wheels rotate in two opposite directions.

The drive assembly comprises a driving oil cylinder, a second link, and a hinged ring. The drive assembly is disposed in a second leg. The hinged ring is disposed on one end of the driving oil cylinder. The hinged ring comprises a hole for receiving one end of the third link. Another end of the second link is connected to one of the two active walking assemblies. The drive assembly is configured to fold or unfold the two active walking assemblies.

The folding assembly comprises a support frame comprising a shaft hole and a groove, a support wheel group comprising a guide post, a spring set, a first spring, a first link, and a guiding base comprising a pilot hole. One end of the support frame is connected to the rack and another end of the support frame is connected to the support wheel group. The guide post is slidable in the shaft hole. The spring set is disposed on the guide post. The first link is disposed in the middle of the groove of the support frame. One end of the first link is configured to slide in the groove of the support frame. Another end of the first link is connected to the guiding base. The guiding base is inserted through the pilot hole and connected to the guide pillar of the rack.

A second spring having low rigidity is disposed between the second leg and the first link. When the wheel set is in direct contact with the base of the oil tank, the truss assembly is disconnected from the robot. The first spring is configured to push the first link. The support frame is fully unfolded when one end of the first link slides to the lowest end of the groove of the support frame. When the robot is hoisted out of the oil tank, the guiding base moves in the direction of the guide pillar of the rack, thereby folding the first link and the support frame. When one end of the first link slides to the highest end of the groove of the support frame, the first link is in a fully folded position. The folding assembly is configured to unfold or fold by gravity of the robot, without the other device or assistance.

The power unit comprises two sets of cleaning plates, a steel wire brush, a motor, a dual shaft power distribution box, two sets of wheels, an end cap, a second drive chain, and an angular contact ball bearing. The motor is fixedly disposed on the rack. The dual shaft power distribution box comprises two second shafts. The two sets of wheels are respectively disposed on both sides of the dual shaft power distribution box. The steel wire brush is disposed on the two sets of cleaning plates. The second drive chain transmits the driving torque to the dual shaft power distribution box and then to the two sets of wheels. The two sets of cleaning plates are disposed on both ends of each wheel by a bolt. The driving torque drives the two sets of cleaning plates to rotate and therefore the arc surface of the oil tank is cleaned. The two sets of cleaning plates are configured to scrape off the stains on the arc surface and arc transition edge of the oil tank. The steel wire brush is configured to clean the side wall of the oil tank. The angular contact ball bearing is disposed on both ends of the second shafts of the dual shaft power distribution box. The rack further comprises a bearing hole disposed on both sides of the rack. The bearing of the angular contact ball bearing is disposed in the bearing holes.

When in use, two adjacent cleaning plates rotate in two opposite directions.

When cleaning the inside of the oil tank, a control system sends a stroke command to the servo motor and the servo motor is configured to control the robot to slide in a straight line in the oil tank. A displacement sensor is configured to accurately detect the position of the robot in the oil tank and to transmit a position signal to the control system. The control system processes the signal and outputs a feedback signal to the servo motor so as to control the walking speed and position of the robot. A visual feedback unit is configured to return the cleaning condition of the oil tank to a visual imaging terminal, thereby cleaning the remaining stains again.

The following advantages are associated with the robot of the disclosure: 1) The robot enters the oil tank through a mouth and automatically cleans the inside of the oil tank; 2) The active walking assembly provides sufficient power source for the robot; 3) The robot is provided with a displacement sensor and a visual feedback unit (having its own light), which is convenient to adjust the position of the robot in the oil tank and remove the difficult stains from the inner wall of the oil tank; 4) The robot uses a plurality of cleaning plates and a steel wire brush to thoroughly clean the arc surface and side wall of the oil tank; and 5) the walking assembly is folded and unfolded automatically, and flexibly compress the oil tank, which requires less power source and has great flexibility.

Figure 1:
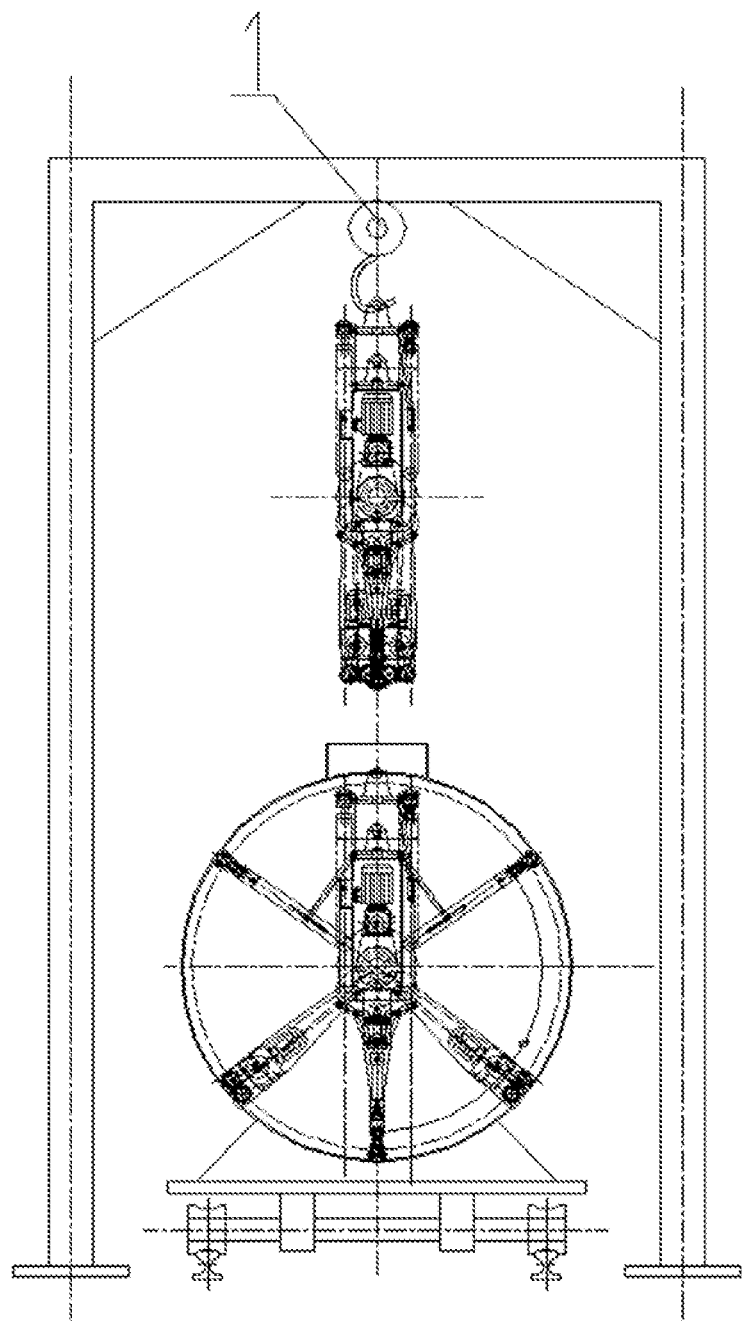
FIG. 1 is a schematic diagram of a robot being hung on the opening of an oil tank.

In the drawings, the following reference numbers are used: 1. Truss assembly; 2. Walking assembly; 3. Power unit; 4. Rack; 5. First link; 6. First leg; 7. Servo motor; 8. Spiral rubber wheel; 9. First drive chain; 10. Spring set; 11. Support wheel group; 12. Driving oil cylinder; 13. Second link; 14. First spring; 15. Cleaning plate; 16. Steel wire brush; 17. Motor; 18. Dual shaft power distribution box; 19. Wheel; 20. End cap; 21. Guiding base; 22. Second drive chain; 23. Gear transmission mechanism; 24. Support frame; 25. Hinged ring; 26. Angular contact ball bearing; 27. Oil tank; 28. Second leg; 29. Displacement sensor; and 30. Visual feedback unit.

DETAILED DESCRIPTION

To further illustrate the disclosure, embodiments detailing a robot are described below. It should be noted that the following embodiments are intended to describe and not to limit the disclosure.

Figures 2A, 2B:
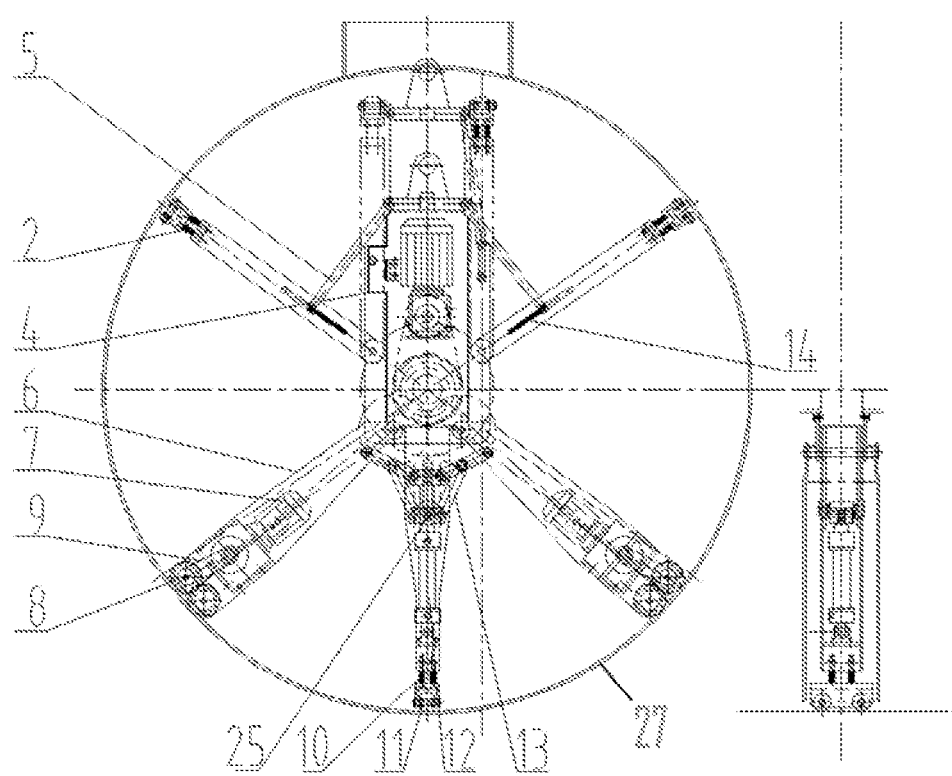
FIG. 2A is a front view of a robot in accordance with the disclosure.
FIG. 2B is a side view of a lower part of the robot in FIG. 2A.
Figure 3:
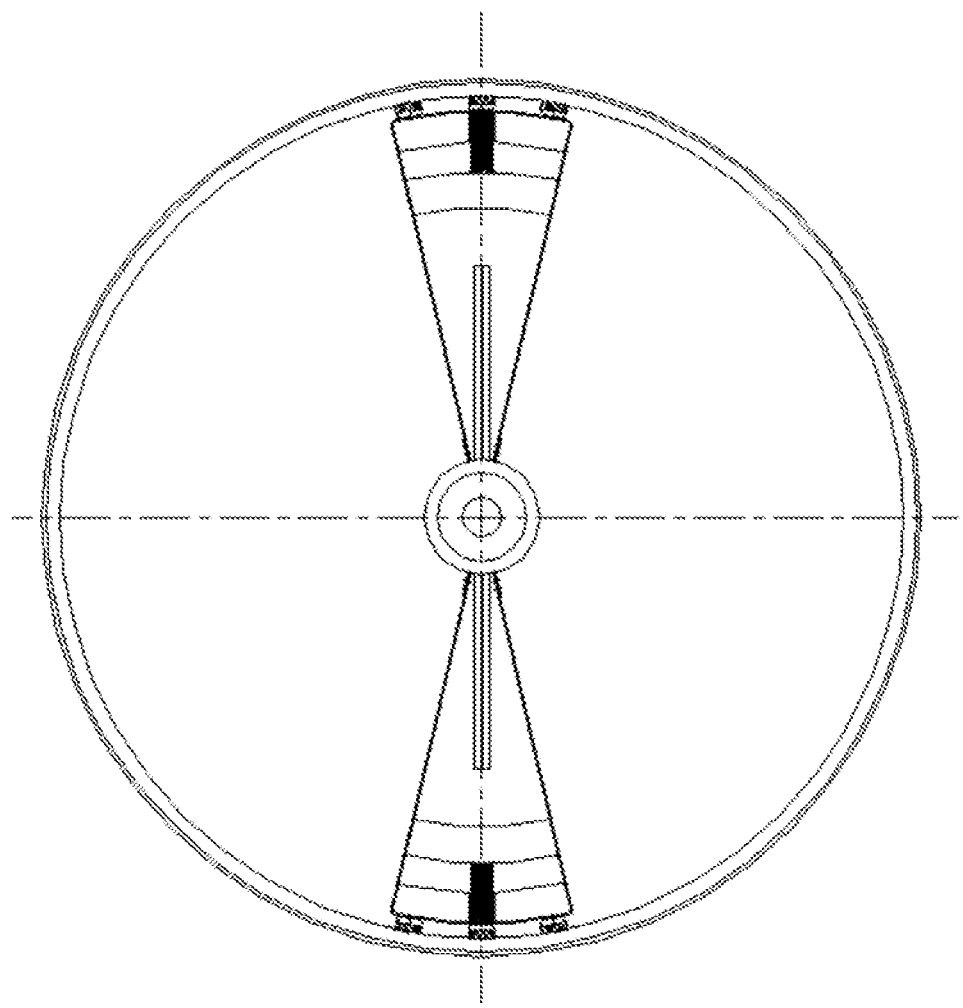
FIG. 3 is a schematic diagram of a robot in accordance with the disclosure in another angle of view.
Figure 4:
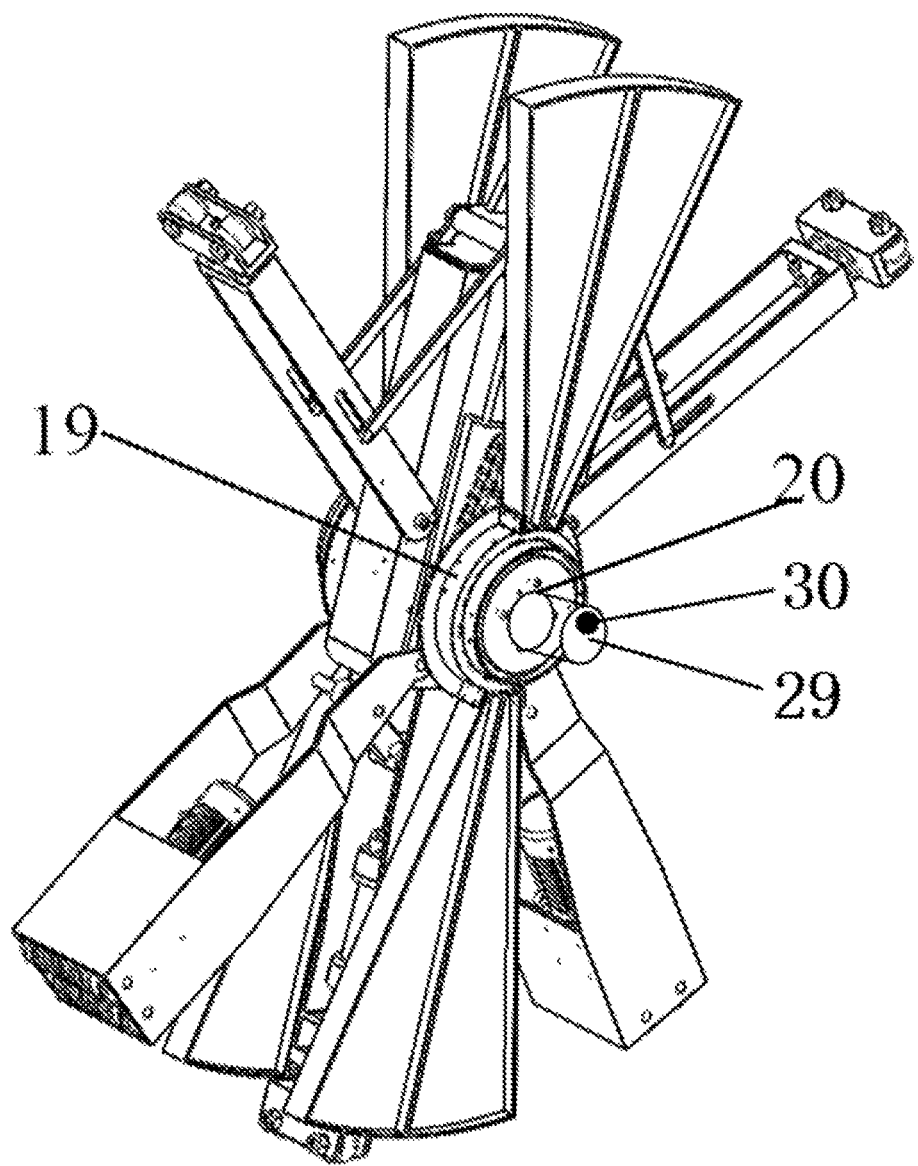
FIG. 4 is a three-dimensional left view of a robot in accordance with the disclosure.
Figure 5:
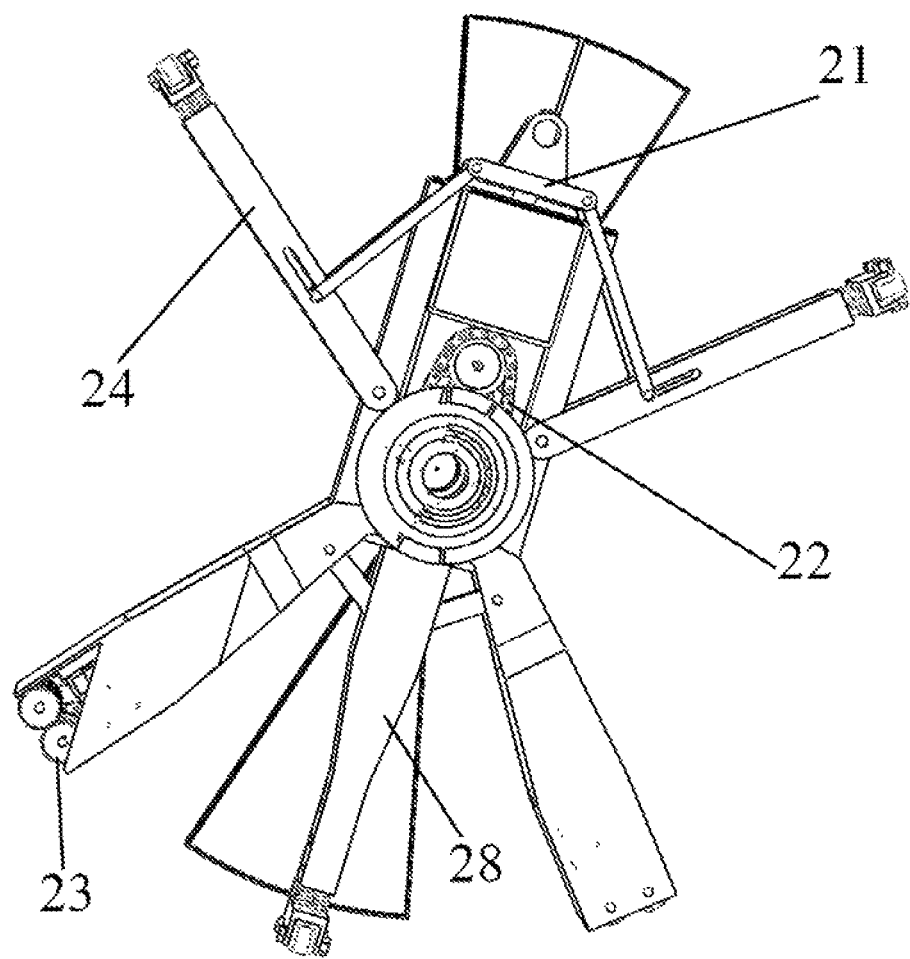
FIG. 5 is a three-dimensional front view of a robot in accordance with the disclosure.
Figure 6:
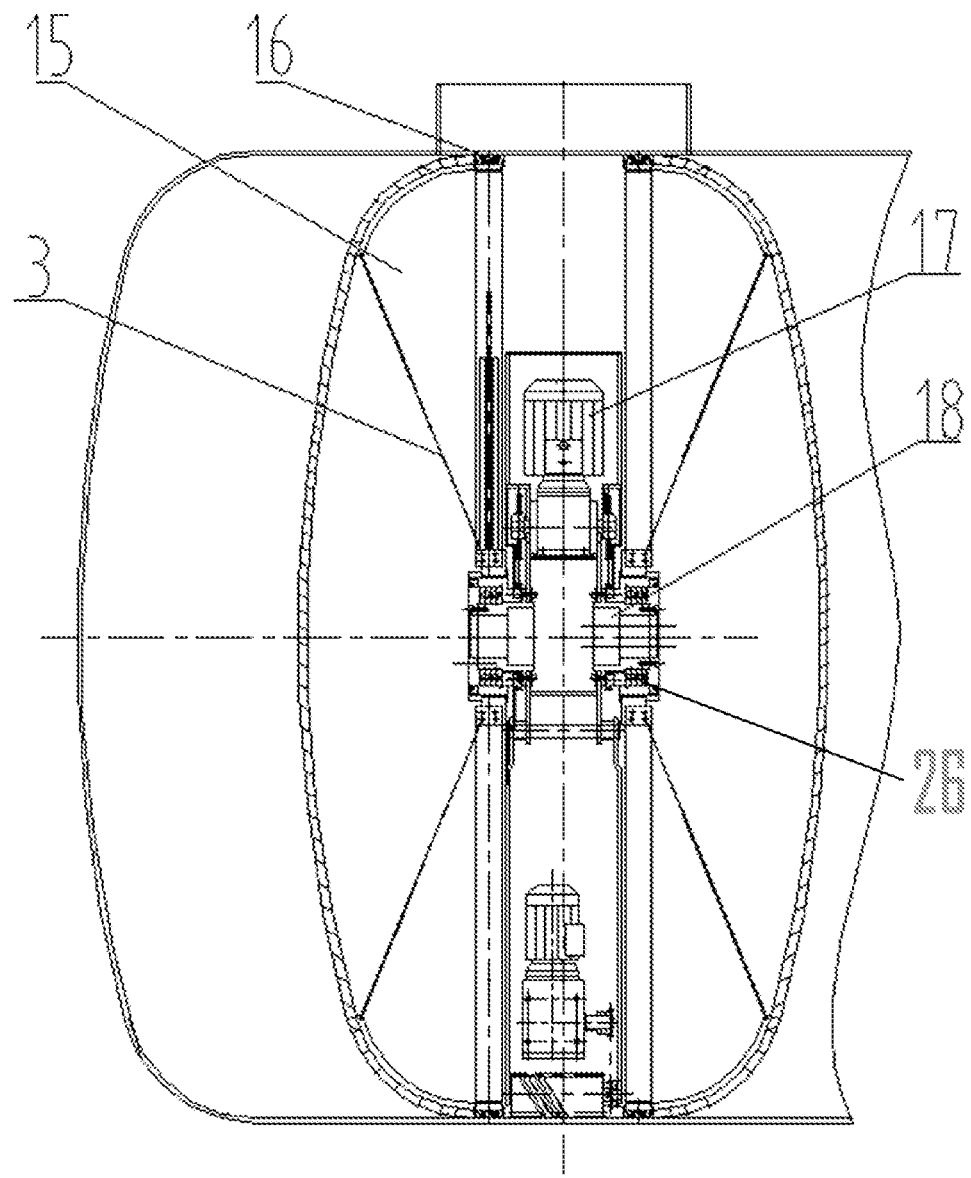
FIG. 6 is a partial sectional view of a robot in accordance with the disclosure.

Referring to FIGS. 1-6, the disclosure provides a robot for oil tank cleaning, comprising: a truss assembly 1, a walking assembly 2, a power unit 3, and a rack 4. When an oil tank 27 needs cleaning, the oil tank 27 is placed directly below the robot by a crane. The robot is hoisted by the truss assembly 1 into a hole of the oil tank 27. When the wheel set 11 is in direct contact with the base of the oil tank 27, the truss assembly 1 is disconnected from the robot. The weight of the robot is supported by the contact surface of the oil tank 27 and the wheel set 11. One end of the first link 5 is pulled by the first spring 14 and slides in the groove of the support frame 24. The guiding base 21 is connected to another end of the first link 5 and slides downward along the guide pillar of the rack 4, thereby unfolding the support frame 24 and contacting the support wheel set with the side wall of the oil tank 27. When the folding assembly enters a working position, a hinged ring 25 disposed above the driving oil cylinder 12 pushes the second link 13, thereby unfolding the first leg 6 and contacting the walking legs with the side wall of the oil tank 27. Then the support wheel group 11 is in close contact with the side wall of the oil tank 27. The interference generated by the driving cylinder 12 is buffered by the spring set 10 disposed around the support wheel group 11.

The servo motor is disposed in the support frame 24. When the walking assembly 2 is unfolded, the servo motor is turned on and transmits the driving torque to one of the two spiral rubber wheels 8 through the first drive chain 9. The spiral rubber wheel 8 rotates and therefore drives the robot to move along the axis of the oil tank 27. The power unit 3 is then turned on and thoroughly cleans the inside of the oil tank 27 through linear and rotary motion. The power unit 3 is powered by a stepper motor. The resulting power is processed by the dual shaft power distribution box 18 and transmitted from the second drive chain 22 to the wheel 19, thereby keeping the two sets of cleaning plates 15 and the steel wire brush 16 to rotate for cleaning of the inner wall of the oil tank 27.

When cleaning the inside of the oil tank 27, a control system sends a stroke command to the servo motor 7 and the servo motor 7 controls the robot to slide in a straight line in the oil tank 27. A displacement sensor 29 accurately detects the position of the robot in the oil tank 27 and transmits the position signal to the control system. The control system processes the signal and outputs a feedback signal to the servo motor 7 so as to control the walking speed and position of the robot. A visual feedback unit returns the cleaning condition of the oil tank 27 to a visual imaging terminal, thereby cleaning the remaining stains again.

It will be obvious to those skilled in the art that changes and modifications may be made, and therefore, the aim in the appended claims is to cover all such changes and modifications.

What is claimed is:

1. A robot, comprising:
   a truss assembly;
   a walking assembly;
   a power unit; and
   a rack;
   wherein:
   the truss assembly is disposed on a top of the rack; the walking assembly is disposed in the rack and fixedly connected to the rack through a bearing; the power unit is disposed on a rear end of the rack;
   the walking assembly comprises two active walking assemblies, a drive assembly, and a folding assembly; the two active walking assemblies are respectively disposed on a hinge point below the rack; the drive assembly is disposed directly below the rack and configured to unfold or fold the two active walking assemblies; the folding assembly is disposed on a guide pillar of the rack and configured to assist the movement of the robot;
   each of the two active walking assemblies comprises two spiral rubber wheels, a servo motor, a first drive chain, a gear transmission mechanism, and a first leg; the servo motor is fixedly disposed on the first leg; one end of the first leg is connected to the rack and another end of the first leg is connected to the gear transmission mechanism; the spiral rubber wheel is disposed on the gear transmission mechanism; the servo motor is configured to transmit a driving torque to one of the two spiral rubber wheels through the first drive chain, and the gear transmission mechanism transmits the driving torque to another spiral rubber wheel;
   the drive assembly comprises a driving oil cylinder, a second link, and a hinged ring; the drive assembly is disposed in a second leg; the hinged ring is disposed on one end of the driving oil cylinder; the hinged ring comprises a hole for receiving one end of a third link; another end of the second link is connected to one of the two active walking assemblies;
   the folding assembly comprises a support frame, a support wheel group, a spring set, a first spring, a first link, and a guiding base comprising a pilot hole; the support frame comprises a shaft hole and a groove; the support wheel group comprises a guide post; one end of the support frame is connected to the rack and another end of the support frame is connected to the support wheel group; the guide post is slidable in the shaft hole; the spring set is disposed on the guide post; the first link is disposed in a middle of the groove of the support frame; one end of the first link is configured to slide in the groove of the support frame; another end of the first link is connected to the guiding base; the guiding base is inserted through the pilot hole and connected to the guide pillar of the rack; and
   the power unit comprises two sets of cleaning plates, a steel wire brush, a motor, a dual shaft power distribution box, two sets of wheels, an end cap, a second drive chain, and an angular contact ball bearing; the motor is fixedly disposed on the rack; the dual shaft power distribution box comprises two second shafts; the two sets of wheels are respectively disposed on both sides of the dual shaft power distribution box; the steel wire brush is disposed on the two sets of cleaning plates; the second drive chain transmits the driving torque to the dual shaft power distribution box and then to the two sets of wheels; the two sets of cleaning plates are disposed on both ends of each wheel by a bolt; the driving torque drives the two sets of cleaning plates to rotate and therefore an arc surface of an oil tank is cleaned; the two sets of cleaning plates are configured to scrape off the stains on the arc surface and arc transition edge of the oil tank; the steel wire brush is configured to clean a side wall of the oil tank; the angular contact ball bearing is disposed on both ends of second shafts of the dual shaft power distribution box; the rack further comprises a bearing hole disposed on both sides of the rack; the bearing of the angular contact ball bearing is disposed in the bearing holes.

2. The robot of claim 1, wherein the spiral rubber wheel comprises a first shaft inserted through a hole disposed in the first leg, and the two adjacent spiral rubber wheels are rotatable in two opposite directions.

3. The robot of claim 1, wherein a second spring having low rigidity is disposed between the second leg and the first link; when the wheel set is in direct contact with the base of the oil tank, the truss assembly is disconnected from the robot; the first spring is configured to push the first link; the support frame is fully unfolded when one end of the first link slides to the lowest end of the groove of the support frame; when the robot is hoisted out of the oil tank, the guiding base moves in the direction of the guide pillar of the rack, thereby folding the first link and the support frame; when one end of the first link slides to the highest end of the groove of the support frame, the first link is in a fully folded position.

4. The robot of claim 1, wherein the folding assembly is unfoldable or foldable by gravity of the robot.

5. The robot of claim 1, wherein two adjacent cleaning plates are rotatable in two opposite directions.

6. The robot of claim 1, wherein when in use, the power unit uses the cleaning plates and the steel wire brush to thoroughly clean the arc surface and side wall of the oil tank.

* * * * *